July 30, 1968

M. J. ANDERSEN 3,394,531

DUST COLLECTOR

Filed Oct. 5, 1966

MARTIN J. ANDERSEN
INVENTOR.

BY

MARTIN J. ANDERSEN
INVENTOR.

United States Patent Office 3,394,531
Patented July 30, 1968

3,394,531
DUST COLLECTOR
Martin J. Andersen, Worcester, Mass., assignor to Riley Stoker Corporation, Worcester, Mass., a corporation of Massachusetts
Filed Oct. 5, 1966, Ser. No. 584,500
2 Claims. (Cl. 55—300)

ABSTRACT OF THE DISCLOSURE

A dust collector apparatus consisting of a housing, a plurality of tubular separators mounted in the housing and arranged in parallel rows, a shaft mounted for rotation in the housing and extending between a pair of parallel rows of separators, a plurality of flexible rapper elements associated with the shaft, and means for driving the shaft.

---

It is common practice in the steam generating field to remove dust from the products of combustion in order to prevent polluting the atmosphere. A common method of removing the dust is to pass the products of combustion through centrifugal separators. Usually, these separators are vertically arranged, the gas and dust entering at the top end of the tubular separators, the gas alone leaving at a side exit, and the dust being thrown downwardly so that it falls into a hopper for subsequent transportation to a disposal site. Considerable difficulty has been experienced, however, with the fact that the separated dust sticks to the inner surfaces of the lower ends of the separator tubes and builds up until the tubes become plugged. When this happens, the dust accumulates until the separator is entirely full of dust and is no longer operative to separate dust from the products of combustion of the steam generating unit. At that time, back pressure and other problems not only prevent the dust collector from operating efficiently, but also affect the operation of the steam generating unit adversely. These and other difficulties experienced with the prior art devices have been obviated in a novel manner by the present invention.

It is, therefore, an outstanding object of the invention to provide a dust collector in which dust does not accumulate on the separator elements.

Another object of this invention is the provision of a dust collector having tubular separator elements having means for removing dust accumulations from the separators.

A further object of the present invention is the provision of a dust collector having a separator rapper apparatus which is simple in construction, which is inexpensive to manufacture, and which is capable of a long life of useful service with a minimum of maintenance.

It is another object of the instant invention to provide a dust collector having means for striking the separators from time to time, which means is so formed to be self-compensating for wear and change in position of the separators.

It is a further object of the invention to provide a dust collector having rappers in which the effective operation of the rappers does not depend upon accurate location of the separators.

With these and other objects in view, as will be apparent to those skilled in the art, the invention resides in the combination of parts set forth in the specification and covered by the claims appended hereto.

Figure 1:
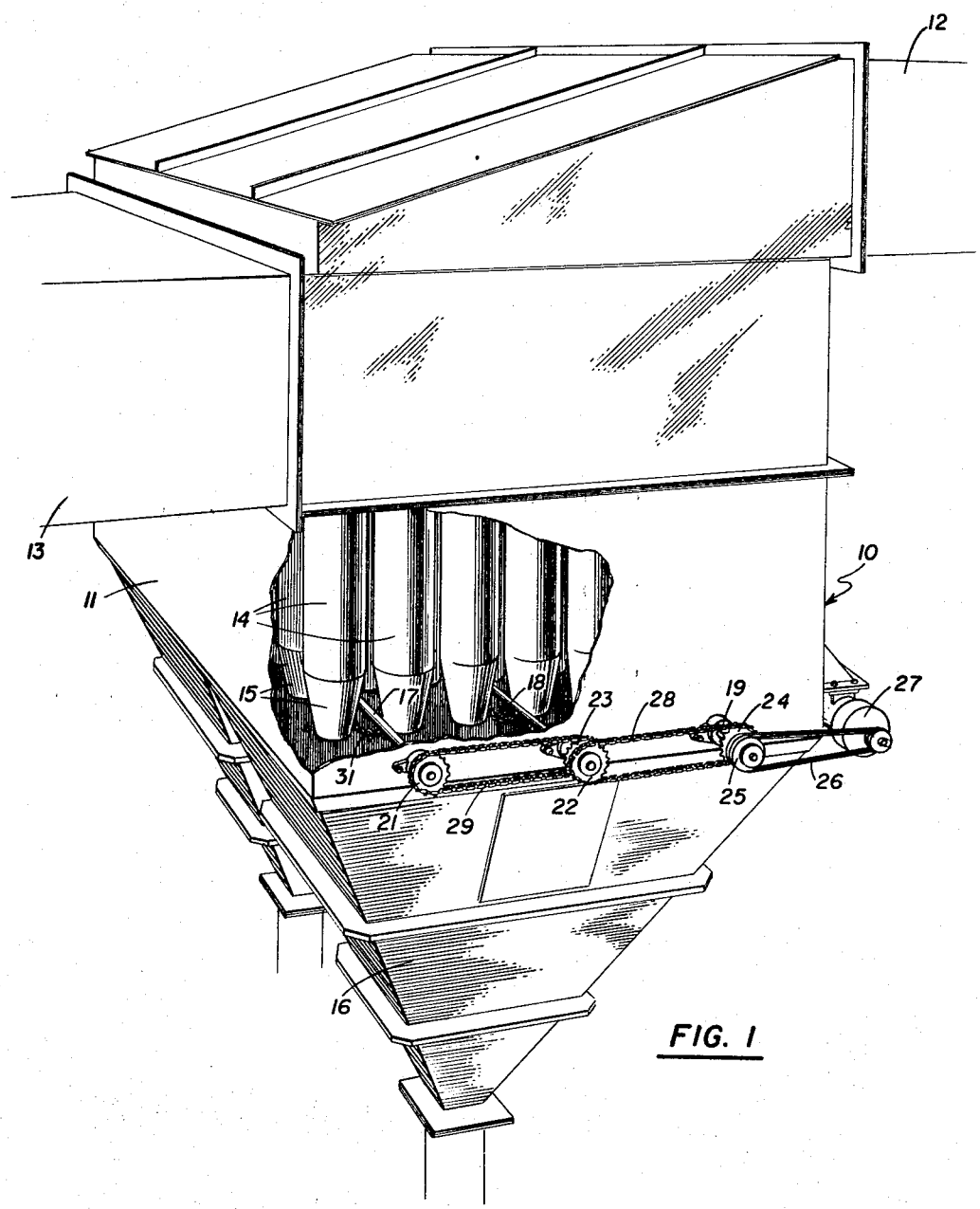
Figure 2:
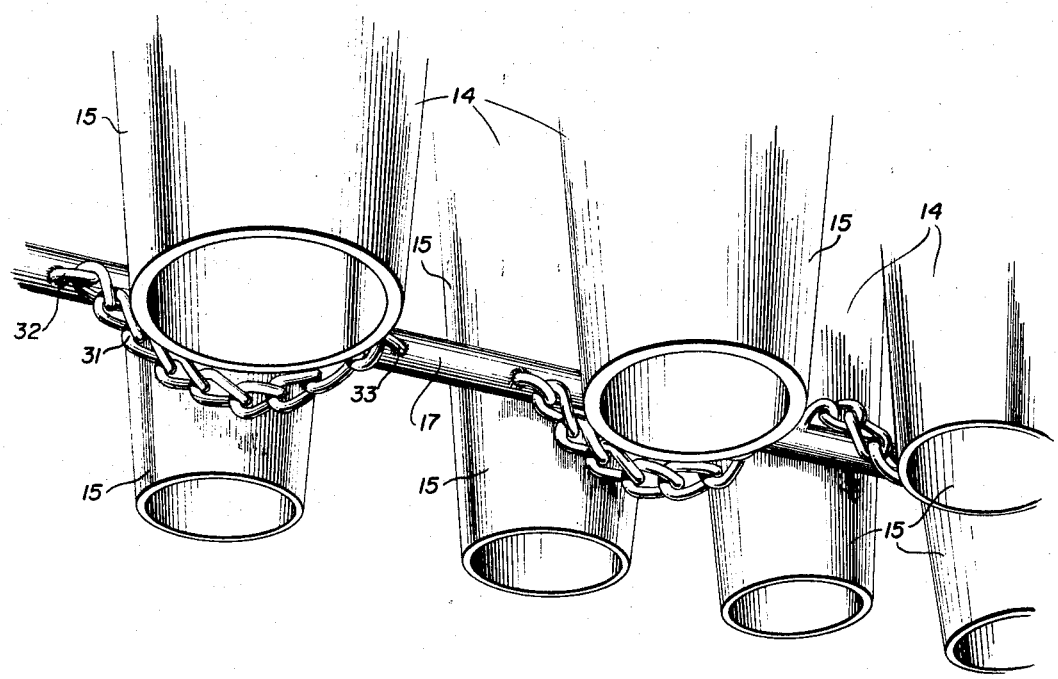

The character of the invention, however, may be best understood by reference to one of its structural forms as illustrated by the accompanying drawings in which:

FIG. 1 is a perspective view of a dust collector embodying the principles of the present invention, and FIG. 2 is a perspective view of a portion of the dust collector.

Referring first to FIG. 1, wherein are best shown the general features of the invention, the dust collector, indicated generally by the reference numeral 10, is shown as having a housing 11 from one side of which extends an inlet duct 12 and an outlet duct 13. Arranged in a series of parallel rows are a number of vertical tubular separators 14. These separators are of the conventional type consisting of a vertical tube to which the inlet duct 12 is connected and an outlet gas scroll to which the outlet duct 13 is connected. Each separator is of the centrifugal type which throws the dust separated from the gas downwardly to a lower end, the lower end being provided with a conical portion 15. Underlying the lower ends of the separators 14 is a hopper 16 from which dust may be removed in the usual way for transportation to a remote disposal area.

Extending between parallel rows of separators 14 are shafts 17, 18, and 19 which are supported in suitable bearings which are mounted on the exterior surface of the housing 11. The shaft 17 is provided with a sprocket 21. The shaft 18 is provided with a sprocket 22 and a sprocket 23, while the shaft 19 is provided with a sprocket 24 and with a pulley 25. The pulley 25 is connected by a V-belt 26 to a motor 27 which is mounted on the exterior of the housing 11. The sprocket 24 of the shaft 19 is connected to the sprocket 22 of the shaft 18 by a chain belt 28, while the sprocket 23 of the shaft 18 is connected by a chain belt 29 to the sprocket 21 associated with the shaft 17. The sprockets and belts are sized to drive the three shafts at the same speed. Associated with each of the shafts 17, 18, and 19 are flexible rapper elements 31.

Referring now to FIG. 2, it can be seen that the shaft 17 is located midway between two parallel rows of separators 14 at the level of the conical portions 15 at the lower ends of the separators. Each flexible rapper element 31 consists of a length of steel chain whose ends are attached to spaced points of the shaft 17 by attachment to loops 32 and 33 which are welded to the shaft 17.

The length of chain in each of the flexible rapper elements is selected so that, when the chain extends outwardly from the shaft 17 (as it will under the influence of centrifugal force as the shaft is rotated), its normal throw will be considerably greater than the distance from the shaft to the surface of each conical portion 15. This assures that the element will strike the surface of the separator, even though the separators are not accurately located in their rows and even though the chain is subjected to some wear or deformation.

The operation of the dust collector will now be readily understood in view of the above description. Products of combustion from a steam generating unit enter the dust collector through the inlet duct 12 and pass into a plenum chamber. From there these gases carry the dust and solid particles into the separator 14. Due to the centrifugal movement of the gas and dust in the separators, the gas is allowed to leave the separator through the outlet duct 13, while the dust is thrown downwardly into the bottom part of the separators. Normally, there will be a certain amount of accumulation of the dust in the conical portions 15 of the dust collectors. With the proper operation of dust collectors, the dust should fall into the hopper 16 from which it would be removed from time to time. However, on occasion, the dust accumulates in the bottom portion due to the presence of moisture in the dust or in the inner surface of the separator. In order to prevent this accumulation from becoming too large, the motor 27 is energized so that it drives through the belt 26 and the various chain belts and sprockets to rotate the shafts 17, 18, and 19. The rotation of the shaft 17, which is typical, causes the flexible rapper element 31 to first strike the conical portion 15 of the separator on one side of the shaft and then strike the separator on the other side of the shaft. In the preferred embodiment, each pair of rows of separators would be provided with its own separate shaft and each opposed pair of separators of each pair of rows would be provided with its own rapper element 31, so that all of the separators would be subject to intermittent blows from a flexible element. Because the throw of the flexible element is selected to be much greater than the distance from the shaft to any possible location of the separators, the striking of each separator by its rapper element is assured. This action takes place despite wear in the flexible element, bending of the shaft, denting of the separator, or mislocation of the separator either in an initial installation or during later operation.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A dust collector, comprising
    (a) a housing,
    (b) a plurality of tubular separators mounted in the housing and arranged in parallel rows,
    (c) a shaft mounted for rotation in the housing and extending between a pair of parallel rows of separators,
    (d) a plurality of rapper elements attached to the shaft each rapper element consisting of a flexible length of material the ends of which are fastened to the shaft at points thereon spaced apart by a distance less than the length of material, and
    (e) means driving the shaft so that each wrapper element is thrown outwardly by centrifugal force and moves through a substantial arc which would pass through adjacent separators were it not for the fact that it strikes the separators, the separators in the pair of parallel rows being arranged so that each rapper element strikes a separator in each row.

2. A dust collector, comprising
    (a) a housing,
    (b) a plurality of tubular separators mounted in the housing and arranged in parallel rows,
    (c) a shaft mounted for rotation in the housing and extending between a pair of parallel rows of separators,
    (d) a plurality of rapper elements attached to the shaft, each rapper element consisting of a length of chain the ends of which are fastened to the shaft at points thereon spaced apart by a distance less than the length of the chain, and
    (e) means driving the shaft so that each rapper element is throw outwardly by centrifugal force and moves through a substantial arc which would pass through adjacent separators were it not for the fact that it strikes the separators, the separators in the pair of parallel rows being arranged so that each rapper element strikes a separator in each row.

References Cited

UNITED STATES PATENTS

| | | | |
|---|---|---|---|
| 1,821,860 | 9/1931 | Werner et al. | 55—300 |
| 1,928,670 | 10/1933 | McCrery | 55—300 |
| 2,533,644 | 12/1950 | Vokes | 55—300 |
| 2,702,090 | 2/1955 | Brown et al. | 55—112 |
| 2,192,250 | 3/1940 | White | 55—112 |

FOREIGN PATENTS

| | | |
|---|---|---|
| 403,859 | 10/1924 | Germany. |
| 452,393 | 11/1927 | Germany. |
| 496,061 | 4/1930 | Germany. |
| 708,111 | 7/1941 | Germany. |

HARRY B. THORNTON, *Primary Examiner.*

S. W. SOKOLOFF, *Assistant Examiner.*